United States Patent [19]
Morris

[11] Patent Number: 5,585,206
[45] Date of Patent: Dec. 17, 1996

[54] BATTERY ELECTRODE INTERCONNECTIONS

[76] Inventor: J. Lee Morris, 207 Vineyard Dr., San Jose, Calif. 95119

[21] Appl. No.: 207,867

[22] Filed: Mar. 8, 1994

[51] Int. Cl.⁶ .................................................. H01M 2/26
[52] U.S. Cl. ........................ 429/161; 429/211; 29/623.4
[58] Field of Search .................................. 429/160, 161, 429/211; 29/623.4

[56] References Cited

U.S. PATENT DOCUMENTS

| | | | |
|---|---|---|---|
| 3,597,277 | 8/1971 | Dickfeldt et al. | 429/161 |
| 4,794,056 | 12/1988 | Pedicini | 429/211 X |
| 4,830,939 | 5/1989 | Lee et al. | 429/192 |
| 4,997,732 | 3/1991 | Austin et al. | 429/153 |
| 5,230,967 | 7/1993 | Radmall | 429/160 X |

FOREIGN PATENT DOCUMENTS 61-294758  12/1986  Japan.

*Primary Examiner*—Stephen Kalafut

[57] ABSTRACT

Electrode sections, such as anode and cathode sections, of a battery cell include current collectors with exposed portions. The exposed portions contain slits which form tabs. These tabs can be spot welded together to form connections between the electrode sections.

21 Claims, 5 Drawing Sheets

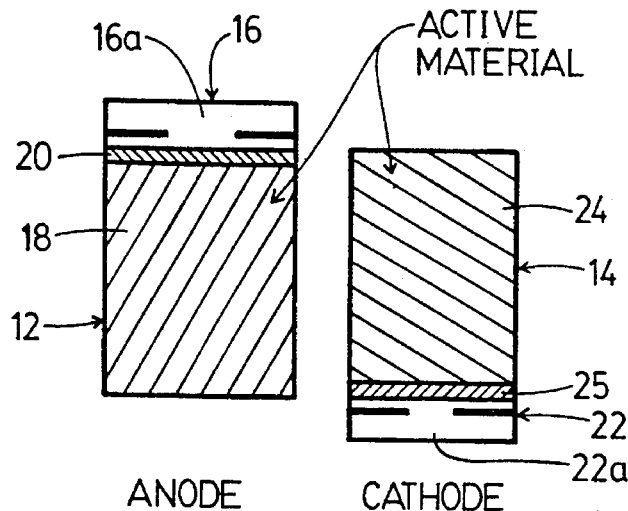
FIG._1.
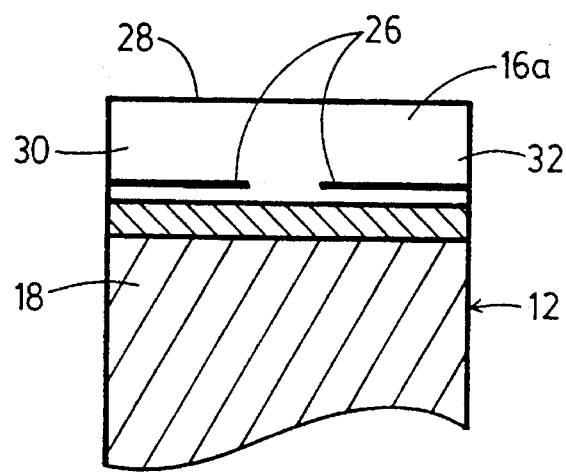
FIG._2.
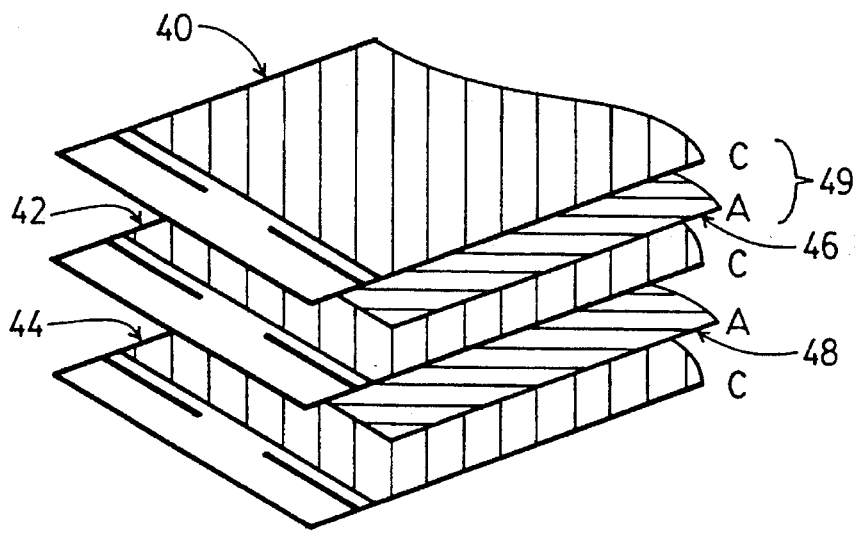
FIG._3.

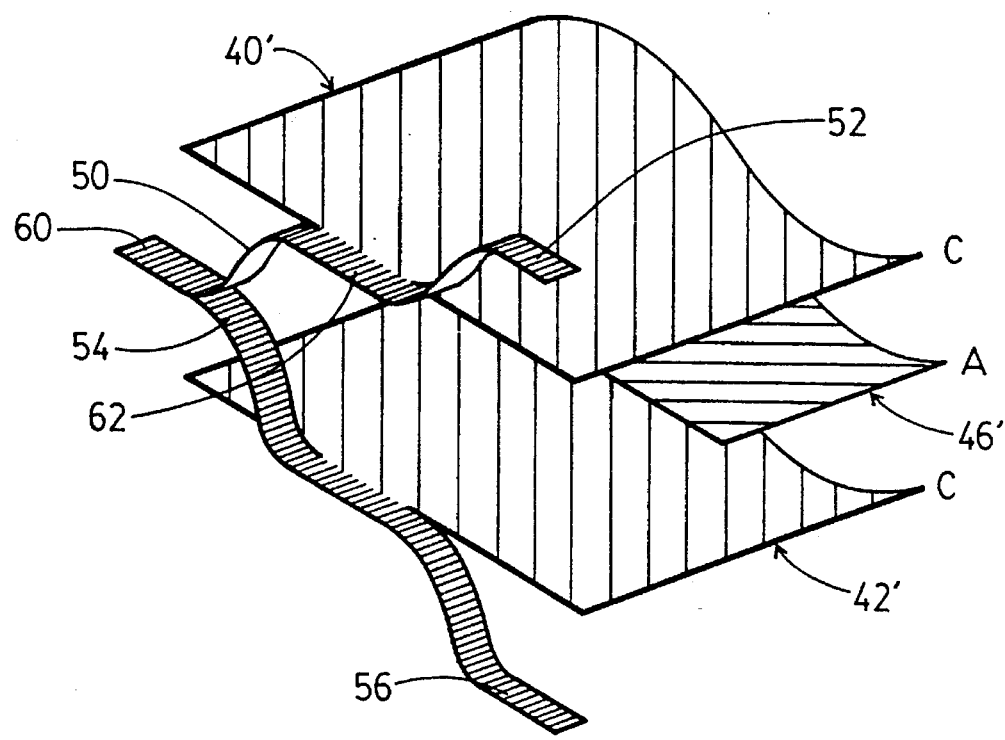
FIG._4A.
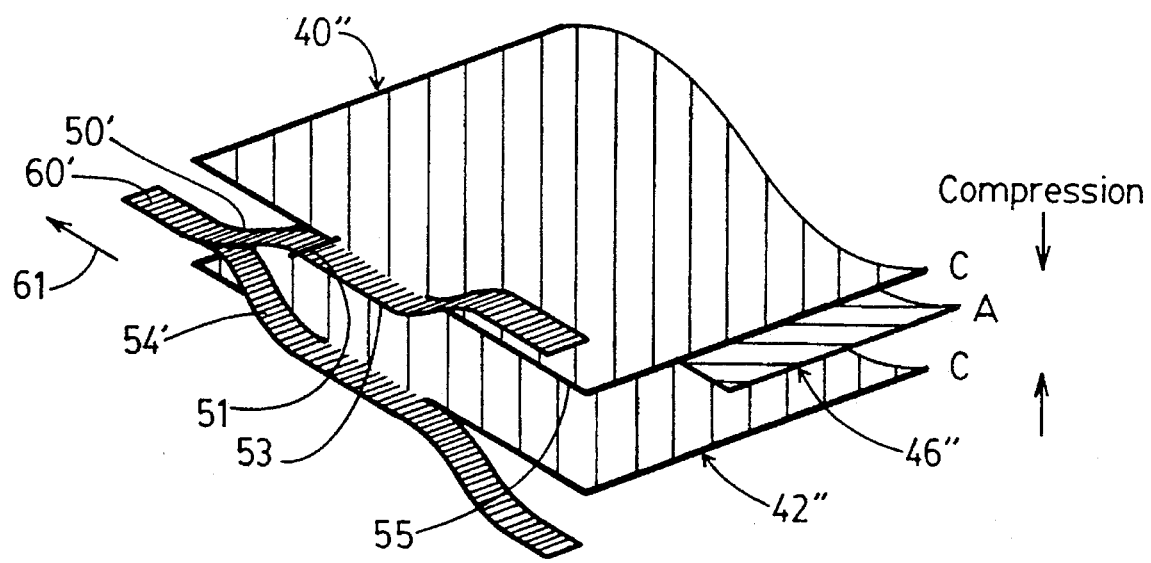
FIG._4B.

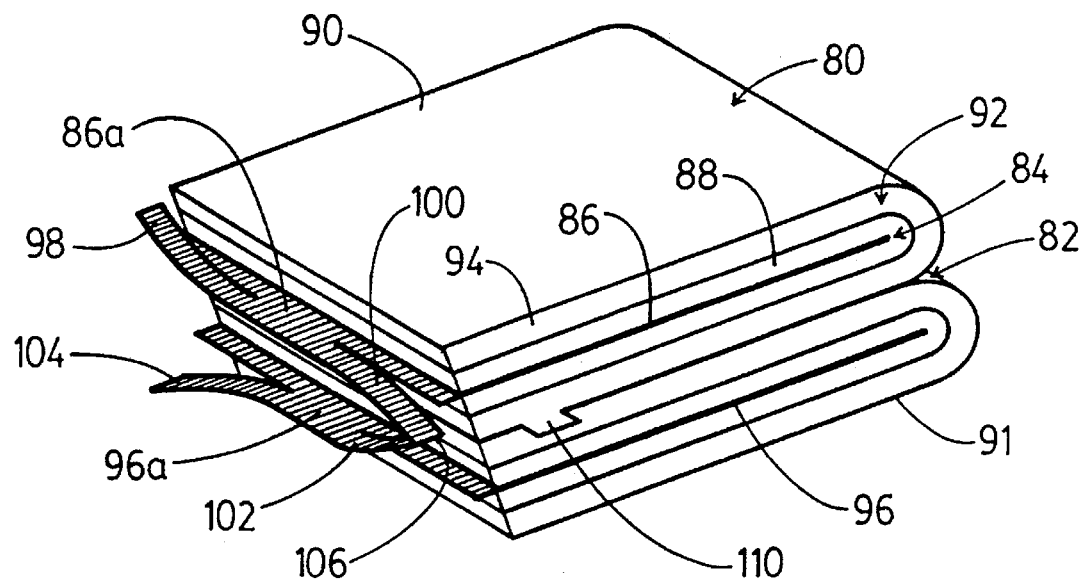
FIG._5.
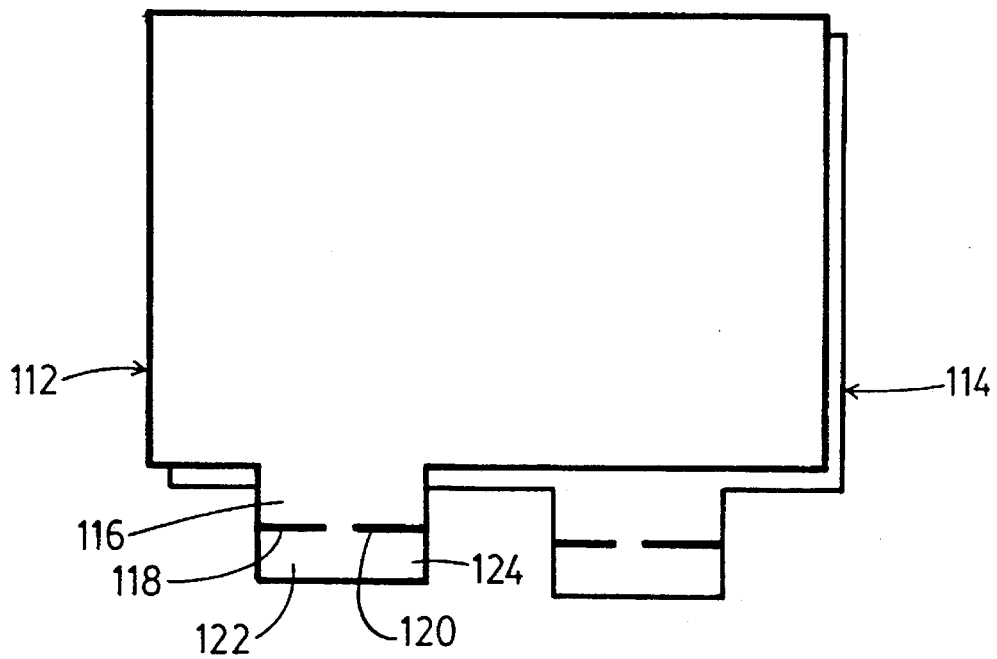
FIG._6.

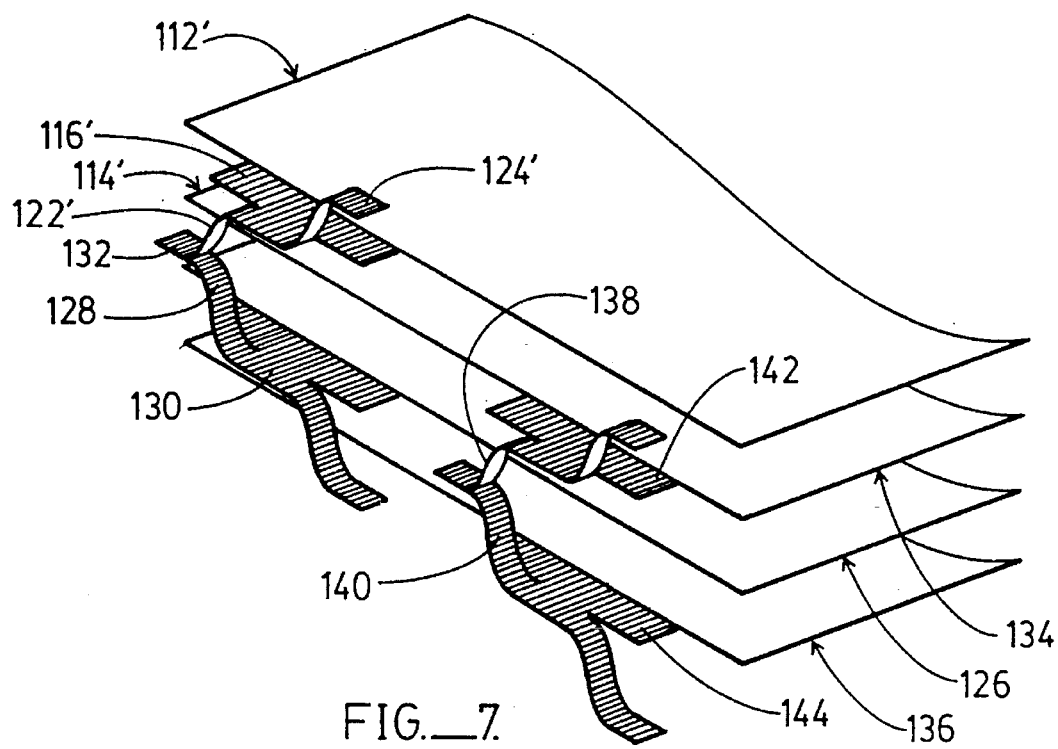
FIG._7.
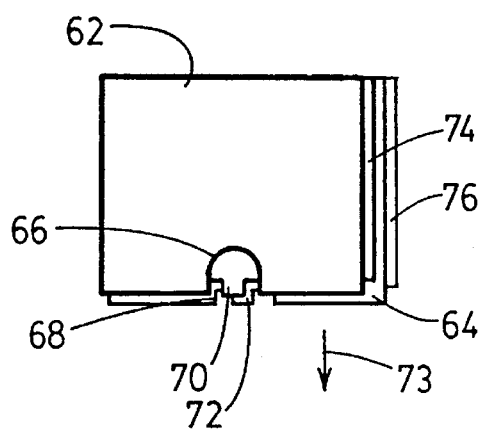
FIG._9.
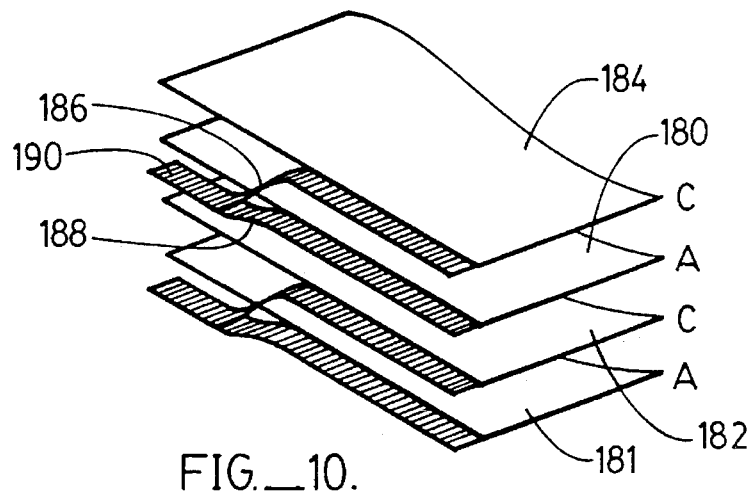
FIG._10.

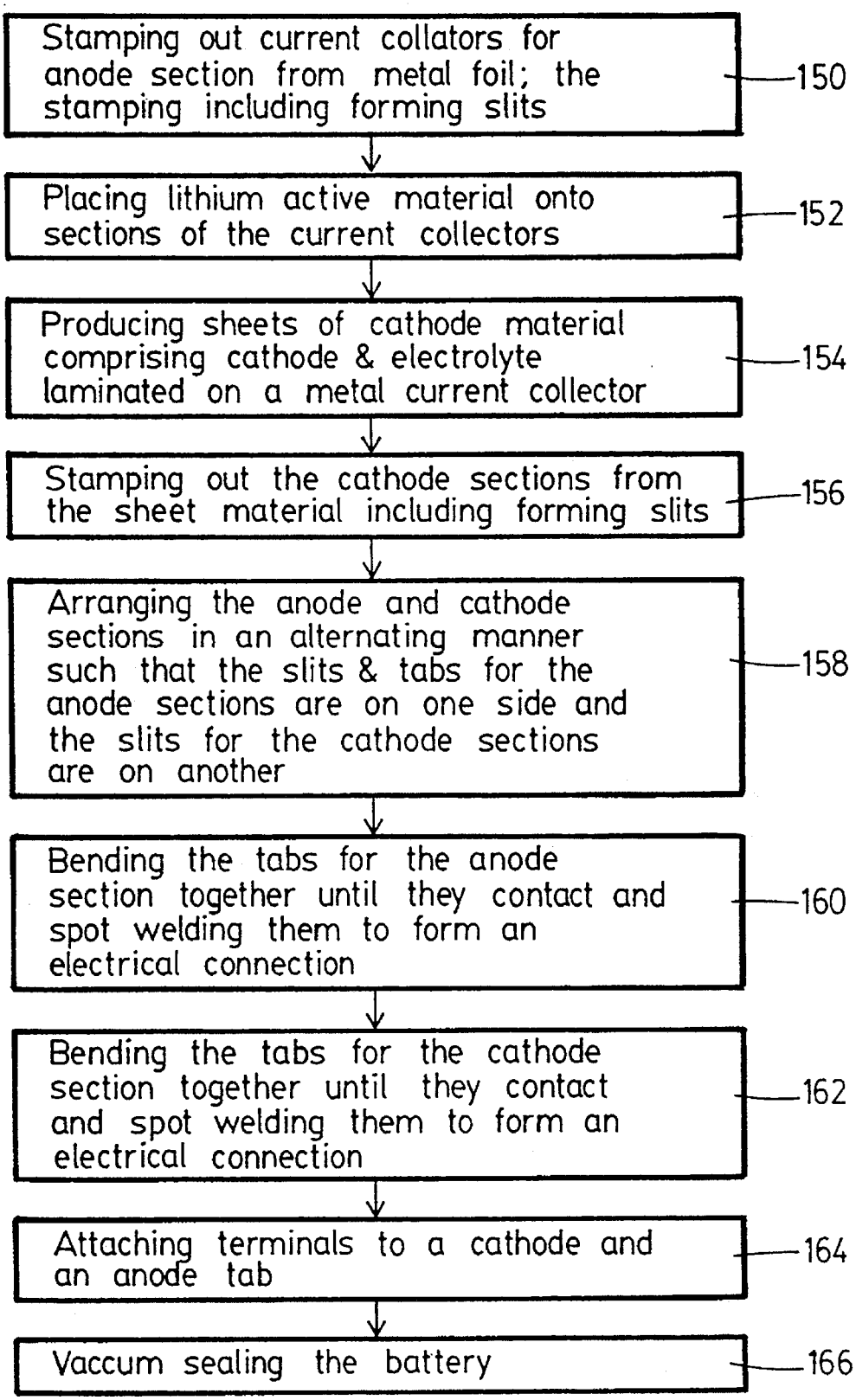
FIG._8.

5,585,206

BATTERY ELECTRODE INTERCONNECTIONS

BACKGROUND OF THE INVENTION

This invention relates to battery connections between current collectors in the battery cells of a laminar multi-cell battery. Batteries often comprise multiple battery cells each including anode and cathode sections. In forming the battery, the anode current collectors are connected together and the cathode current collectors are connected together. It is desired to have improved connections between the current collectors of the anode and cathode sections of a multi-cell battery.

SUMMARY OF THE INVENTION

The advantage of the present invention is that tabs are formed on the current collectors of the electrode sections of the battery. The electrode sections include cathode and anode sections. Slits are cut into the exposed sections of the current collectors such that tabs are formed. These tabs can be moved up or down to contact the tabs on the current collector of the electrode section above or below it. In this manner, current collectors for the electrode sections can be connected together as desired.

A benefit of this method of connecting the electrode sections of a multiple-cell battery is that when the battery is packaged, the tabs will flex and additional strain is not placed upon the contact between the tabs. Additionally, this type of contact is more secure and is better able to withstand abuse during the life of the battery.

In accordance with the principles of the present inventions, the above and other objectives are realized by using a battery comprising a first battery cell having a first electrode section with associated current collector and a second electrode section. The current collector associated with the first electrode section defines a slit such that there is a tab on one side of the current collector. A second battery cell has a third electrode section with associated current collector and a fourth electrode section. Additional battery cells can be attached as needed for the battery design. The battery is such that the current collector associated with the third electrode section defines a slit such that there is a tab on one side of the current collector and wherein the tab associated with the third electrode section is attached to the current collector associated with the first electrode section. Electrode sections on the additional battery cells can be attached as needed.

In one embodiment, the first and third electrode sections are anode sections and the second and fourth electrode section are cathode sections. In this embodiment, the battery cells are connected in parallel.

In another embodiment, the first and fourth electrode sections are anode sections and the second and third electrode section are cathode sections. In this other embodiment, the battery cells are connected in series.

In addition, the above and other objectives are realized by using a method for constructing a battery comprising the steps of providing a first electrode section with associated current collector. The providing step includes forming a slit in the first electrode section such that there is a tab on one side of the current collector. The method also comprises providing a second electrode section with associated current collector. The second electrode section providing step includes forming a slit in the second electrode section such that there is a tab on one side of the current collector. The method also includes connecting the tab on the first electrode section and second electrode section to form an electrical contact.

BRIEF DESCRIPTION OF THE DRAWINGS

The above and other features and aspects of the present invention will become more apparent upon reading the following detailed description in conjunction with the accompanying drawings, in which:

FIG. 1 is a top view of the anode and cathode sections used to form the battery of the present invention;

FIG. 2 is a partial top view of the anode section showing the slits which form the tabs;

FIG. 3 is a partial perspective view of the anode and cathode sections of the present invention;

FIG. 4A is a partial perspective view of the anode and cathode sections showing connections between two cathode sections;

FIG. 4B is a partial perspective view of the anode and cathode sections showing the anode and cathode sections moved closer together;

FIG. 5 is a partial perspective view of the connection between hi-cells;

FIG. 6 is a top view of anode and cathode sections of an alternate embodiment of the present invention;

FIG. 7 is a partial perspective view of the anode and cathode sections of this alternate embodiment which shows the tabs for the anode and the cathode current collectors on the same side;

FIG. 8 is a flow chart of the method of the present invention;

FIG. 9 is a top view of anode and cathode sections showing a connection scheme; and FIG. 10 is a partial perspective view of another embodiment of the present invention showing connections between an anode section and two cathode sections.

DETAILED DESCRIPTION OF THE PREFERRED EMBODIMENT

FIG. 1 is a top view of the anode section 12 and the cathode section 14. The anode section 12 is comprised of a current collector 16 preferably formed from copper foil. This current collector 16 has an exposed section 16a. Other portions of the current collector 16 are covered by the active material 18. The active material 18 is preferably lithium. A nonconductive mylar spacer 20 is also placed upon the active material or current collector in order to avoid shorting. The cathode section 14 includes a current collector 22 which is preferably made of aluminum foil. The current collector 22 includes an exposed area 22a. The active material 24 is comprised of laminated cathode and electrolyte material. The lamination of the electrolyte/cathode material is described in the patent to Lee et al., U.S. Pat. No. 4,830,939, which is incorporated herein by reference. The cathode section 14 may also have a mylar section 25.

Both the cathode section 14 and anode section 12 are electrode sections. Each electrode section includes an active material attached to a metal current collector.

FIG. 2 is a partial view of the anode section showing slits 26 which are formed in the exposed section 16a of the anode section 12. FIG. 2 shows the geometry of the slits. The uncoated current collector section 16a is on one side of the anode section 12. The slits 26 do not extend into the coated area nor intersect edge 28. Preferably, the slits 26 are parallel to the edge of the active material 18 and parallel to the edge 28 of the uncoated current collector section 16a. Tabs 30 and 32 are formed by the slits 26.

FIG. 3 is a partial perspective view of the anode sections 46 and 48 and cathode sections 40, 42 and 44 arranged one on top of each other. As many anode and cathode sections as desired can be stacked on top of each other to form the battery. Each side of cathode sections 40, 42 and 44 contains the laminated electrolyte cathode material. Each side of the anode sections 46 and 48 contain the lithium material. For this reason, any adjacent cathode and anode sections form a battery cell such as battery cell 49 comprised of anode section 46 and cathode section 40.

FIG. 4A is a partial perspective view of the anode section 46' and the cathode sections 42' and 40'. The slits in the cathode sections 40' and 42' form tabs 50 and 52 in the cathode section 40' and 54 and 56 in the cathode section 42'. The tabs 50, 52, 54 and 56 are flexible since they can be made of a metal foil material. Tabs 50 and 52 go out of the plane defined by the anode section 40'. Note that tabs 50 and 54 can be moved together to touch each other and then spot welded to form a contact at point 60. This spot weld has conductive advantages over conductive epoxy. However, conductive epoxy could be used as an alternative. Note that section 62 remains in the plane defined by the anode section 40'. These connections between the current collectors of the cathode sections 40' and 42' can be made as the anode and cathode sections are placed on top of each other during the assembly of the battery. Note that on the other side of the battery (not shown), tabs can connect together the current collectors for the anode sections of the battery.

FIG. 4B is a partial perspective view of the anode and cathode sections showing the sections closer together than shown in FIG. 4A. The cathode sections 40" and 42" and the anode section 46" are compressed together when the battery is packaged. In the preferred embodiment, the battery is packaged by being vacuum sealed. The pressure of the vacuum sealing laminates together the anode and cathode sections so that the cathode and anode current collectors are separated by about 2 to 4 mils. Note that when the battery is compressed, the tabs 50' and 54' move closer together but would not bend outward from the rest of the battery section or create kinks. The welded section 60' would likely move along the edge of the cathode sections in the direction of arrow 61. The compression of the cathode sections 40" and 42" would not put undue stress upon the connection 60' of the tabs 50' and 54'. This form of connection is able to withstand abuse after the battery is formed, can have ease of assembly benefits, and is less likely to short. Additionally, the tab 50' is bent along a line 51 perpendicular to the edge 53 of the exposed area and the edge 55 of the active material. Bending the tab 50' along line 51 ensures that no deformation is done of the active material at the edges of the cathode sections 40" and 42". Some benefits of the connection scheme of the present invention can be seen with respect to FIG. 9.

FIG. 9 is a top view of anode and cathode sections showing a connection scheme. This view shows cathode sections 62 and 64. These cathode sections have cut-out sections 66 and 68 that allow access to tabs 70 and 72 on the anode section 74 and 76. The tabs 70 and 72 can then be accessed by the assembler and connected to a metal strip (not shown) with a silver conductive epoxy. Note that when the anode sections 74 and 76 and cathode sections 62 and 64 are compressed together in the packaging of the battery, the metal strip (not shown) connecting tabs 70 and 72 will be compressed together and will try to bulge outward in the direction of arrow 73. The packaging material (not shown) will restrain the metal strip (not shown) from freely bulging outward in the direction of arrow 73. For this reason, the compression may cause stresses which would cause the metal strip (not shown) to lose the connection with some of the tabs 70 and 72. In addition, the tabs 70 and 72 could not be spot welded to the metal strip (not shown). Furthermore, the tabs 70 and 72 and the cut-out sections 66 and 68 must be carefully aligned in order to assemble the battery. The connection between the metal strip (not shown) and the tabs such as tab 70 and 72 may also be less durable under battery mistreatment.

FIG. 5 is a partial perspective view of the connection between bi-cells shown in the connection scheme of the present invention. FIG. 5 shows bi-cells 80 and 82. Bi-cell 80 is constructed of a lithium anode section 84 comprised of current collector 86 and the lithium anode 88. Bi-cell 80 also comprises the aluminum current collector 90 for the cathode section 92 which also comprises a electrolyte/cathode laminate material 94. The construction of the bi-cell such as bi-cells 80 or 82 except for the connection scheme of the present invention can be seen as described in Austin U.S. Pat. No. 4,997,732, which is incorporated herein by reference. This reference also shows the composite packaging material which can be used for the batteries of the present invention. The current collectors for the anode sections, current collectors 86 and 96, have exposed current collector sections 86a and 96a. These exposed sections have slits formed therein such that tabs 98 and 100 are formed in the exposed section 86a and tabs 102 and 104 are formed in exposed section 96a. Note that tabs 100 and 102 can be connected together with a connection 106. This connection scheme has many of the advantages discussed above with respect to FIG. 4B. Looking again at FIG. 5, the aluminum cathode collectors 90 and 91 loop around the bi-cells 80 and 82 so that there is an electrical connection between cathode current collectors 90 and 91 of the two bi-cells when bi-cell 80 is placed on top of bi-cells 82. Additionally, a connection 110 can be formed with two tabs of the cathode current collectors 90 and 91 sticking out of the side of bi-cells 80 and 82. This connection 110 can be spot welded together.

FIG. 6 is a top view of anode section 112 and cathode section 114 of an alternate embodiment. In this alternate embodiment, anode section 112 has a protrusion 116 from the current collector of the anode section 112. Slits 118 and 120 are formed in this protrusion to form tabs 122 and 124.

FIG. 7 is a partial perspective view of the anode and cathode sections of the alternate embodiment shown in FIG. 6. In FIG. 7, anode section 112' includes the uncovered protrusion 116' of the current collector, which includes the tabs 122' and 124'. Tab 122' is connected to tab 128 of the exposed current collector section 130 on the anode section 126. Tabs 128 and 122' are connected by connection 132. Cathode sections 134 and 136 are connected by tabs 138 and 140. Tab 138 is part of the current collector 142 on cathode section 134. Tab 140 is part of the current collector 144 on the cathode section 136. Note that both of the tab connection scheme structures are on one side of the battery in this embodiment.

FIGS. 3–7 illustrate an embodiment of the present invention whose battery cells or bi-cells are connected in parallel. FIG. 10 shows an example of an alternate embodiment whose battery cells are connected in series. FIG. 10 is a partial perspective view of another embodiment of the present invention showing a connection between an anode section 180 and a cathode section 184 and a connection between anode section 181 and cathode section 182. The tab 186 of cathode section 184 and tab 188 of anode section 180 are formed in the same manner described above and a contact is formed at point 190. Note that the cathode sections are attached to anode sections in this alternate embodiment. An external tab can be placed on the top cathode section and bottom anode section to form the external terminals.

FIG. 8 is a flow chart of the method of the present invention. In step 150, the current collectors for the anode sections are cut from metal foil such as a copper foil. In one embodiment, the copper foil comes out in a long strip and the current collectors as well as the slits in the current collectors are stamped out of the strip. In step 152, the active material, which is in the preferred embodiment lithium, is placed upon the current collectors. The lithium in the preferred embodiment does not cover an exposed current collector section which includes the slits.

In step 154, a sheet strip of a cathode material which comprises the cathode and electrolyte materials laminated upon a metal current collector is produced. The sheet strip is typically produced in a long ribbon of material. The sheet strip of cathode material has an exposed section that is not laminated with the cathode and electrolyte material. The current collector material is preferably aluminum.

In step 156, the cathode sections are stamped out from the sheet material such that slits are formed in the exposed current collector section. In step 158, the anode and cathode sections are arranged in an alternating manner such that the slits and tabs for the anode sections are on one side and the slits and tabs for the cathode sections are on another. In a preferred embodiment, the slits and tabs for the anode section are on the opposite side from the slits and tabs of the cathode section. In the alternate embodiment with respect to FIG. 7, the slits and tabs for the anode sections and the cathode sections can be on the same side of the battery. Looking again at FIG. 8, in step 160, the tabs for the nearby anode sections are bent together until they contact and are then spot welded together to form an electrical connection. In step 162, the tabs for the cathode section are bent together until they contact and spot welded together to form electrical connections. Steps 160 and 162 can be combined in an alternating manner such that, as an anode or cathode section is placed upon the stack, one of the tabs of the anode or cathode section is spot welded to one of the tabs of the same type section. Of course, In steps 158–162, cathode sections are connected to anode sections by the tabs if the embodiment of FIG. 10 is desired.

Looking again at FIG. 8, in step 164, a terminal is attached to one of the anode and one of the cathode tabs. In step 166, the battery is packaged such that the terminals attached in step 164 extend out of the battery. The packaging step can be done by vacuum sealing the battery. The packaging step 166 could be done with a composite packaging material comprised of mylar and aluminum layers.

Note that the steps for constructing the battery shown in FIG. 5 are slightly different. For example, only the tabs on the anode current collector need to be connected.

Various details of the implementation and method are merely illustrative of the invention. It will be understood that various changes in such details may be within the scope of the invention, which is to be limited only by the appended claims.

What is claimed:

1. A battery comprising:

a first battery cell having a first electrode section with associated current collector and a second electrode section, wherein the current collector associated with the first electrode section defines a slit such that a section of the current collector next to the slit forms tab; and a second battery cell having a third electrode section with associated current collector and a fourth electrode section, wherein the current collector associated with the third electrode section defines a slit such that a section of the current collector next to the slit forms a tab and wherein the tab associated with the third electrode section is attached to the current collector associated with the first electrode section.

2. The battery of claim 1, wherein the first and third electrode sections are anode sections whose associated current collectors are in electrical contact and wherein the second and fourth electrode section are cathode sections.

3. The battery of claim 1, wherein the first and fourth electrode sections are anode sections and wherein the second and third electrode section are cathode sections, so that one of the anode sections and one of the cathode sections have associated current collectors which are in electrical contact.

4. The battery of claim 1, wherein the current collector associated with the first electrode section defines therein two slits such that sections of the current collector next to the two slits form two tabs and wherein the current collector associated with the third electrode section defines therein two slits such that sections of the current collector next to the two slits form two tabs and wherein one of the tabs associated with the third electrode section is attached to one of the tabs associated with the first electrode section.

5. The battery of claim 1, wherein the first electrode section is further comprised of an active material covering part of the current collector wherein a section of the current collector does not contact the active material and wherein the slit is defined in said section.

6. The battery of claim 5, wherein the section not covered by the active material includes an edge of the current collector and wherein the slit defined in the current collector does not intersect the edge.

7. The battery of claim 6, wherein the slit defined in the current collector is parallel to the edge.

8. The battery of claim 6, wherein two slits are defined in the section of the current collector not covered by the active material and wherein the tabs are defined between the edge and the slits and wherein the part of the current collector covered by the active material defines a plane and the tabs are bent along a line at the base of the tab and the tabs extend out of the plane.

9. The battery of claim 8, wherein the lines are perpendicular to the edge.

10. The battery of claim 8, wherein the current collector is a planar thin sheet of metal defining said plane except for said tabs that extend out of said plane.

11. The battery of claim 8, wherein a portion of the section of the current collector not covered by the active material is in said plane.

12. The battery of claim 8, wherein the active material includes lithium.

13. The battery of claim 1, wherein said first and second battery cell are bi-cells each having two cathode sections with an associated current collector.

14. The battery of claim 1, wherein the second electrode section of the first battery cell has an associated current collector that defines a slit such that a section of the current collector next to the slit forms a tab; and wherein the fourth electrode section of the second battery cell has an associated current collector defining a slit such that a section of the current collector next to the slit forms a tab on one side of the current collector and wherein the tab associated with the fourth electrode section is attached to the current collector associated with the second electrode section.

15. The battery of claim 1, further comprising additional battery cells.

16. A method for constructing a battery comprising the steps of:

provididing a first electrode section with associated current collector, wherein said providing step includes forming a slit in said first electrode section such that a section of the current collector next to the slit forms a tab;

providing second electrode section with associated current collector, wherein the second electrode section providing step includes forming a slit in said second electrode section such that a section of the current collector next to the slit forms a tab; and connecting the tab on the first electrode section and second electrode section to form an electrical contact.

17. The method of claim 16, wherein said first and second electrode sections are first and second anode sections, the method further comprising the steps of providing first and second cathode sections with current collectors and placing the first cathode section together with the first anode section to form a first battery cell and placing the second cathode section with the second anode section to form a second battery cell.

18. The method of claim 16, wherein the first electrode providing step further comprises providing a bi-cell including two cathode sections and said first electrode, said first electrode comprising an anode section.

19. The method of claim 16, wherein said connecting step includes the step of bending the tabs together and attaching the tabs to each other by spot welding.

20. The method of claim 19, wherein said anode section providing step includes stamping out the current collector and slit from a sheet of metal and placing the active material onto parts of the current collector.

21. The method of claim 16, further comprising vacuum sealing said first and second electrode sections.

* * * * *